United States Patent
Braemig et al.

(10) Patent No.: US 6,286,867 B1
(45) Date of Patent: Sep. 11, 2001

(54) PROTECTIVE ARRANGEMENT ON A WHEEL HOUSING OF A MOTOR VEHICLE SHELL

(75) Inventors: Falk-Hagen Braemig, Herrenberg; Guenther Epple, Rottenburg; Bernd Harloff, Boeblingen; Rolf Zimmermann, Ehningen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/373,988

(22) Filed: Aug. 16, 1999

(30) Foreign Application Priority Data

Aug. 14, 1998 (DE) ................................. 198 36 851

(51) Int. Cl.⁷ ........................... B62D 21/15; B60R 19/00
(52) U.S. Cl. ..................... 280/784; 280/762; 280/770; 296/198; 296/188
(58) Field of Search ....................... 280/784, 154, 280/850, 854, 762, 770; 296/188, 189, 198

(56) References Cited

U.S. PATENT DOCUMENTS

| | | | |
|---|---|---|---|
| 2,450,958 | * 10/1948 | Hayes | 280/154 |
| 3,794,342 | * 2/1974 | Froumaja et al. | 280/784 |
| 3,795,410 | * 3/1974 | Huber | 280/784 |
| 4,712,829 | 12/1987 | Hurten et al. | 296/203 |
| 5,275,436 | 1/1994 | Pomero | |
| 5,803,533 | 9/1998 | Shultz et al. | 296/204 |
| 5,813,718 | * 9/1998 | Masuda et al. | 296/188 |

FOREIGN PATENT DOCUMENTS

| | | |
|---|---|---|
| 22 57 940 | 6/1974 | (DE) . |
| 3243756 | 11/1982 | (DE) . |
| 43 02 240 A1 | * 8/1993 | (DE) . |
| 195 44 424 | 11/1995 | (DE) . |
| 198 35 705 A1 | * 2/2000 | (DE) . |
| 2-258481 | 10/1990 | (JP) . |
| 8-108863 | * 4/1996 | (JP) . |
| WO 94/06669 | 3/1994 | (WO) . |

* cited by examiner

Primary Examiner—Lanna Mai
Assistant Examiner—Ruth Ilan
(74) Attorney, Agent, or Firm—Crowell & Moring LLP

(57) ABSTRACT

A protective arrangement on a motor vehicle shell wheel housing has a crumple zone, in particular a front crumple zone. Two longitudinal members extend in the longitudinal direction of the vehicle and along the inside of the associated lateral wheel housing. A wheel is held by wheel guide members within the assigned wheel housing. A front wall limits the wheel housing on its side remote from the crumple zone, relative to the passenger compartment. Protection against excessive penetration of the front wall by the wheel moving towards the front wall in the event of a crash is arranged between the tread circumference of the wheel and the front wall. A tension strut with a fixing section is fixed to the associated longitudinal member as the protection of the front wall against excessive penetration and has a lateral intercepting section which projects outwards laterally and transversely to the longitudinal member.

15 Claims, 5 Drawing Sheets

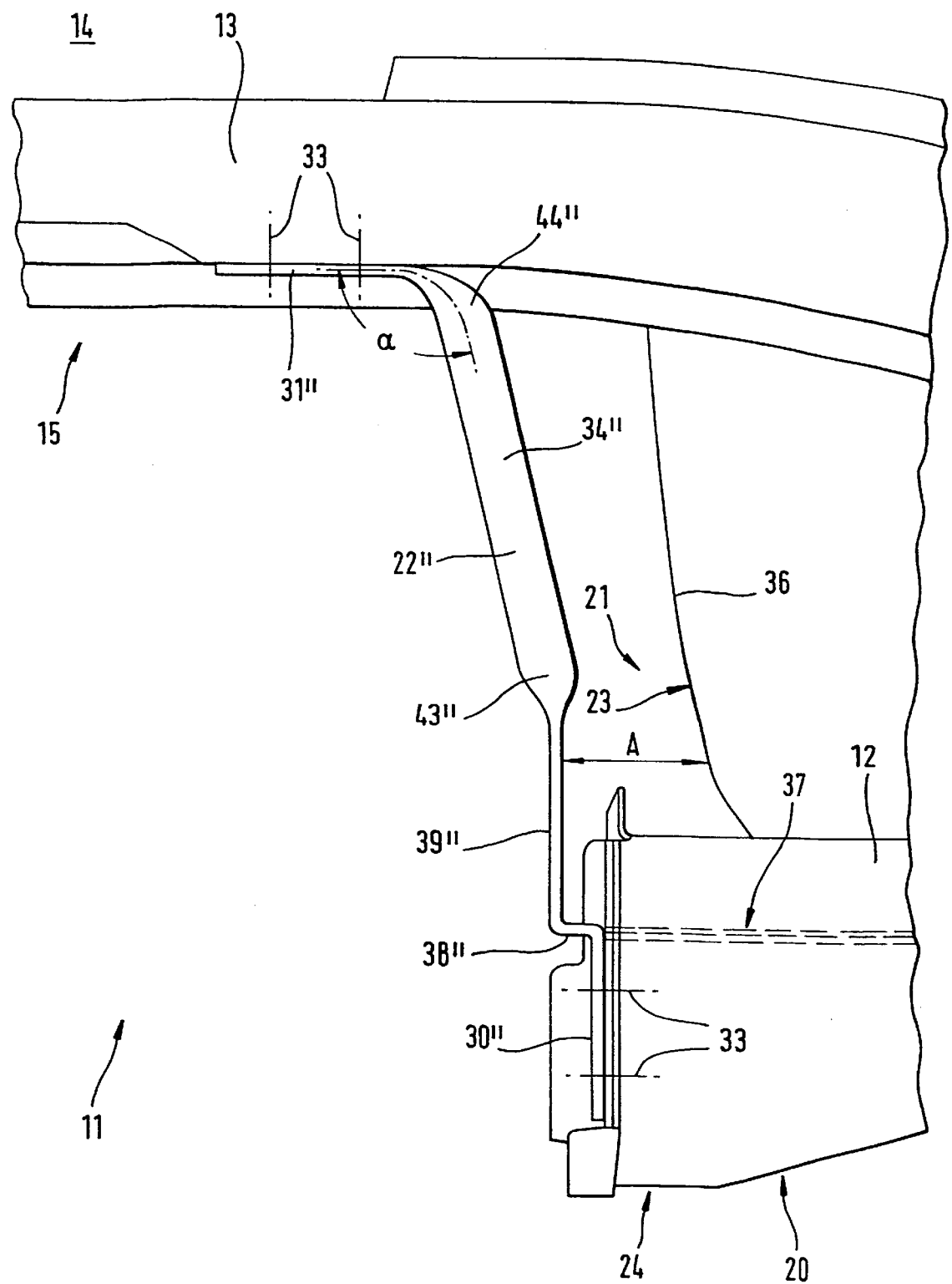

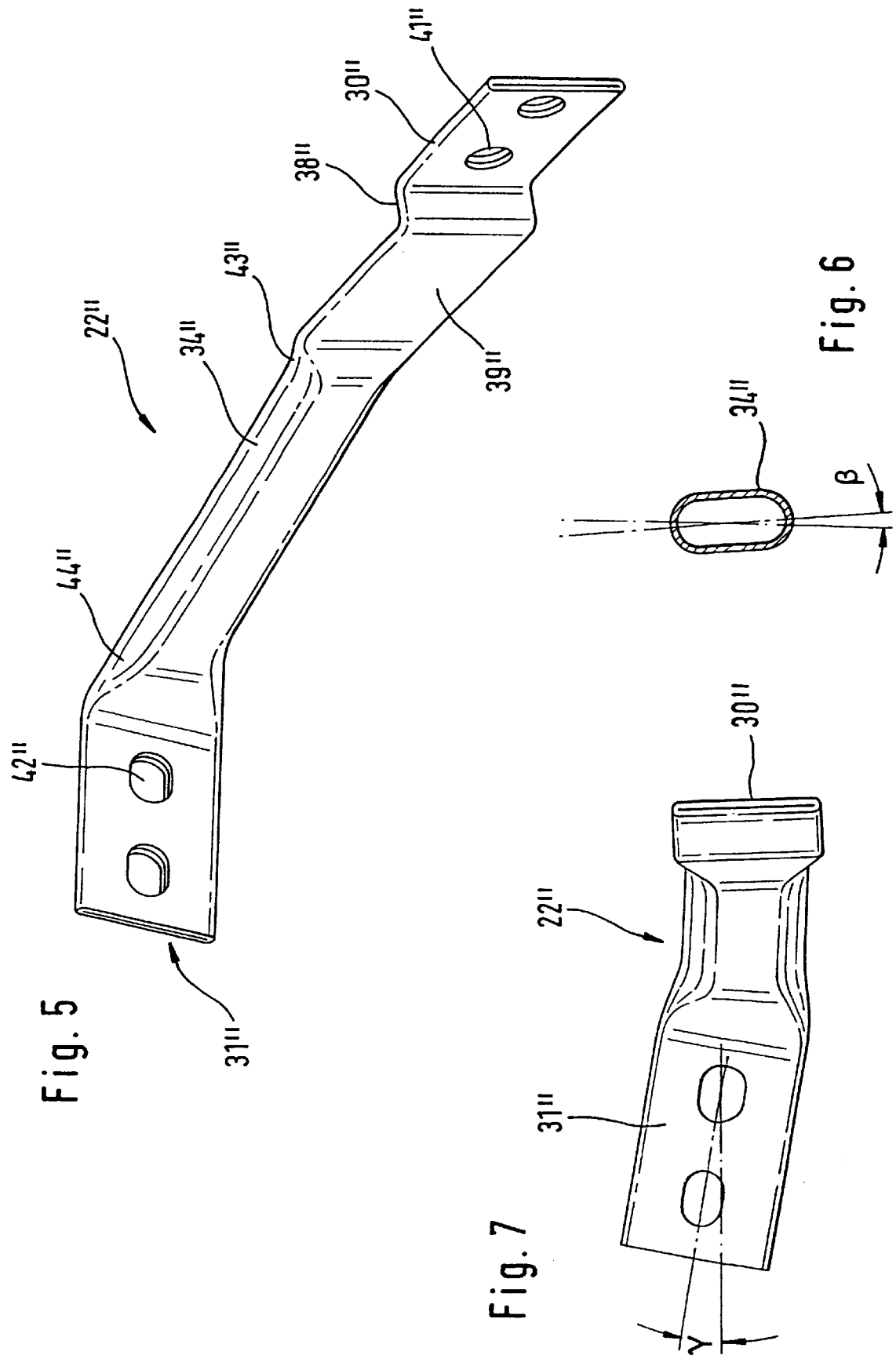

PROTECTIVE ARRANGEMENT ON A WHEEL HOUSING OF A MOTOR VEHICLE SHELL

BACKGROUND OF THE INVENTION

The present invention relates to a protective arrangement on a wheel housing of a motor vehicle shell. More particularly, the present invention relates to a protective arrangement having a crumple zone, in particular a front crumple zone, in which two longitudinal members extend in the longitudinal direction of the vehicle and along the inside of the associated lateral wheel housing, having a wheel which is held by wheel guide members within the assigned wheel housing, having a front wall, which limits the wheel housing on its side remote from the crumple zone, relative to the passenger compartment, and having means for the protection against excessive penetration of the front wall by the wheel moving towards the front wall in the event of a crash, the protecting means being arranged between the tread circumference of the wheel and the front wall.

A protective arrangement on a wheel housing of a motor vehicle shell is described in DE-AS 22 57 940 and relates to a front part for motor vehicles. A deflector member is arranged on the rear wall of a front wheel housing. The deflector member has welded-together sheet metal parts which are welded or bolted to the rear wall of the wheel housing.

The deflector members functions to guide the front wheels, as they move backwards against the deflector members in the event of a frontal impact, outwards and out of the wheel housing and so remove them from the path of deformation. As a result of the oblique outward and rearward deflection of the front wheels, the intention is, among other things, to prevent a deformation of the front wall of the vehicle and penetration of the wheel rim into the footwell.

As the front wheels are deflected obliquely outwards and out of the wheel housings and backwards into the region of the two front doors by the deflector members in the event of a frontal impact, this protective arrangement has the disadvantage that the front doors, in the event of a relatively serious accident, can be possible to open only partially and with a great expenditure of force, or even impossible to open at all, as a result of which it is made more difficult for an accident victim to escape from the vehicle.

SUMMARY OF THE INVENTION

An object of the present invention, therefore, is to provide a protective arrangement on a wheel housing of a motor vehicle shell to protect the front wall from excessive deformation and intrusion by the wheel and to prevent a deflective movement of the wheel out of the wheel housing into the region to the side of the doors.

This object has been achieved according to the present invention by a protective arrangement on a motor vehicle shell wheel housing by providing that a tension strut with a fixing section is fixed to the associated longitudinal member as a means for protecting the front wall against excessive penetration and projects outwards laterally and transversely to the longitudinal member with a lateral intercepting section.

In the protective arrangement according to the present invention, a tension strut, as a way of protecting the front wall against excessive intrusion, is fixed within the wheel housing by a fixing section to the associated longitudinal member such that, with an intercepting section projecting outwards laterally and transversely to the longitudinal member, the movement of a wheel which has been involved in an accident and moved backwards is stopped. Thus excessive deformation or penetration of the front wall by the wheel is prevented. As a result, injuries to passengers can be significantly reduced, especially in the region of the feet, thighs or knees. The tension strut is, of course, of appropriately strong configuration in the region between the fixing section and the intercepting section to resist the forces arising, especially tensile and flexural forces, and to transmit them to the longitudinal member.

The protective arrangement of the present invention is particularly advantageous in an offset frontal impact with a slight widthwise overlap of the motor vehicles involved and in a direct oblique impact from the front against the front wheel. In such event, the inner and, in this case, front longitudinal members are not struck from the front and so are not activated as a crumple zone. With the fixing of the tension strut to the longitudinal member, in an accident scenario as described above, the energy of the front wheel intercepted by the tension strut can be transmitted to the longitudinal member and thus the crumple zone in the region at the height of the front wheels is activated.

Because the fixing section of the tension strut is fixed sufficiently far forward on the longitudinal member, a correspondingly large part of the longitudinal member, and hence also of the front crumple zone of the vehicle, can be used to receive, primarily, a tensile force and to reduce the accident energy. Thus, a significantly improved accident performance arises as a result of the improved energy absorption of the entire section of the shell affected.

In a frontal impact with greater widthwise overlap and, in particular, with higher vehicle speeds, the protective arrangement according to the present invention has the advantage of providing that the movement of the front wheel taking place after the deformation of the front crumple zone is intercepted and its kinetic energy is transmitted to the longitudinal member. Thereby, optimum use is made of the remaining front crumple zone in the region of the front wheel housings.

The protective arrangement can thus be used both at the front wheels, in the region of the front crumple zone, and also in the region of the rear wheels and of the rear crumple zone. Not only because of the fact that the driver's seat is always occupied, the protective arrangement is particularly preferably arranged at the wheel housing on the front off-side. For the driver, the further advantages arising are that the risk of penetration of the pedals into the footwell and the risk of upward projection of the steering wheel can be significantly reduced.

In a further embodiment of the invention, the tension strut is particularly advantageously arranged between the inner longitudinal member and an end section of a lateral longitudinal member or longitudinal member section. The tension strut additionally is fixed to the end section of the lateral longitudinal member. As a result, a strong protective arrangement is obtained with a particularly advantageous accident performance, because a large section of the shell, which encompasses both the inner and the lateral longitudinal member, can be subjected to the action of the energy of the moving wheel. That is, in addition to the front longitudinal member, the lateral longitudinal member can also be used thereby to absorb the energy arising.

If the tension strut is arranged at a minimum distance in front of the front wall which varies in accordance with the shell, it can be deformed backwards by the minimum distance under the impact of the backward-moving front wheel for energy absorption purposes, without this resulting in a deformation of the front wall. The result of this is to provide a particularly safe protective arrangement. Excessive penetration of the wheel into the front wall even in serious accidents is thereby prevented.

As a result of the fixing of the tension strut below or at the height of a horizontal plane through the axle of the front wheel, the wheel moving backwards in the event of a crash is stopped in the region of its tread circumference and, at the same time, excessive penetration of the front wheel into the front wall above or below the tension strut is also prevented.

The intercepting section of the tension strut can include an angle of approximately 100–140° with a lateral section of the inner longitudinal member, and can be directed towards the front end of the lateral longitudinal member, so that the tension strut, in the event of a crash, steers the wheel towards the front end of the lateral longitudinal member. This arrangement has the advantage that as much energy as possible is passed by the tension strut to the lateral longitudinal member and can be reduced thereby. Thus, the tension strut not only performs the function of holding the front wheel back but, at the same time, also exercises a guide function towards the front end of the lateral longitudinal member. In addition, the angle is selected so that, in the event of a crash, the tensile force exerted by the tension strut on the inner longitudinal member, considered vectorially, is mostly passed in the longitudinal direction of the longitudinal member and the front longitudinal member is thus advantageously used to reduce part of the accident energy.

It has also proven advantageous to fix the tension strut to the end section of the lateral longitudinal member and to the inner longitudinal member in a releasable manner by screw connections and the like. As a result, the tension strut can also be retrofitted as a separate component to vehicles whose shell possesses a lateral longitudinal member adjoining the front wheel housing and an inner longitudinal member. It is thus possible also significantly to improve the crash performance of older vehicles configured without this tension strut, provided that the tension strut can be fixed to the inner and, if appropriate, lateral longitudinal member. If the tension strut has been damaged in the exercise of its function as a result of a minor accident, it can simply be replaced for a new tension strut as a result of the screw connection.

It has also proved preferable for the tension strut to be provided with slots to bring about the screw connection. The slots serve to compensate the horizontal and vertical tolerance of the protective arrangement. The tension strut can thus be adapted with a precise fit in order to guarantee maximum possible protection against an impact of the wheel against the front wall in the event of a crash. As a result of this adaptability, the tension strut can also be used for a plurality of different vehicle models.

If the tension strut is already provided when the vehicle is manufactured, it may, in a further embodiment of the present invention, be unreleasably fixed by a weld or rivet or similar connection to the end section of the lateral longitudinal member and to the front longitudinal member. Consequently, a particularly strong connection is achieved between the longitudinal members and the tension strut to withstands high deformational and tensile forces.

It has also proved particularly preferable to configure the end section of the lateral longitudinal member as an impact absorber. This impact absorber has the property of being able to absorb a particularly large amount of accident energy in the event of an accident, thus, in particular, also relieving the stress on the shell lying behind the impact absorber in the direction of travel and so reducing its deformation in the event of an accident.

In a further embodiment of the present invention, the tension strut is made from a fiber composite such as, for example, a high-strength metallic material in the form of a profiled tension band of sheet steel or the like which is able to absorb high deformatory forces. In a simple embodiment, the tension strut can be produced in sections from a steel cable which possesses adequately breaking-resistant and deformable properties.

In crash tests, a tension strut which has proved particularly advantageous is made from a tube, especially of oval cross section, the ends of which are pressed flat in the region of the fixing sections. This tension strut is particularly resistant to bending and breakage and exhibits good energy absorption properties. Thus, a wheel running into the tension strut is slowed in its movement relatively gently and, as a result, the shell is additionally relieved of stress. As a result of the flat-pressed fixing sections at the ends of the tension strut, a particularly tension-resistant and precisely fitting connection can be achieved between the tension strut and the associated seatings on the longitudinal members.

In a further particularly advantageous embodiment, the tension strut has a right-angled stop bend located approximately in the extension of the inner longitudinal member flank of the lateral longitudinal member. In the event of an offset or straight frontal impact, the right-angled stop bend forms a stop for an inner or outer rim flare of the front wheel rim. Thereby, the front wheel is retained in its direction of movement towards the region of the end section of the lateral longitudinal member and impacts on the latter to reduce the crash energy.

Depending on the angle of lock at the time of the frontal impact, the front wheel can be held, with the aid of the right-angled stop bend and the rim flare running into it, as far as possible in the region of the lateral longitudinal member and hence also as far as possible away from the footwell of the front-seat passengers. That is, as a result of the rim flare running into this right-angled stop bend, a steering movement or lock movement of the front wheel triggered by the frontal impact can be stopped and the front wheel held in the direction of the lateral longitudinal member.

A yet further advantage of the right-angled stop bend is that the distance of the tension strut from the front wall in the region thereof is increased. As a result, a greater deformation path of the tension strut is available in the event of a frontal impact. In addition, the right-angled stop bend contributes to a gentler braking of the front wheel.

BRIEF DESCRIPTION OF THE DRAWINGS

Other objects, advantages and novel features of the present invention will become apparent from the following detailed description of the invention when considered in conjunction with the accompanying drawings.

FIG. 4 is a section view from below of the protective arrangement according to the present invention having the tension strut arranged between the inner and lateral longitudinal members shown in FIG. 3;

FIG. 5 is a perspective view of the tension strut shown in FIGS. 3 and 4;

FIG. 6 is a sectional view through an intercepting section of the tension strut of FIG. 5.

DETAILED DESCRIPTION OF THE DRAWINGS

Figure 1:
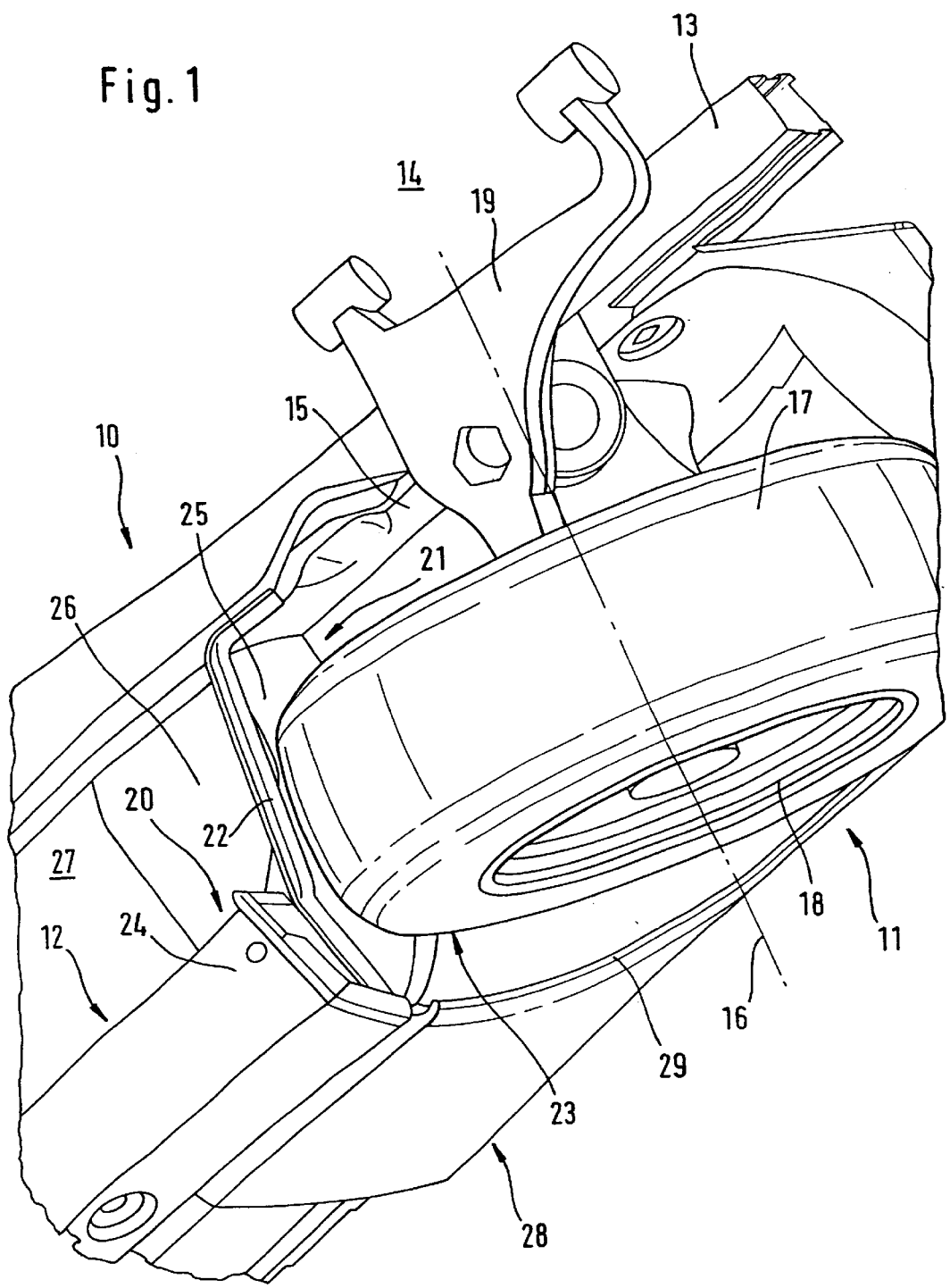
FIG. 1 is a perspective view from below of a section of a motor vehicle with a protective arrangement according to the present invention on a front wheel housing.

FIG. 1 shows in a sectional, perspective view from below a motor vehicle with its partially visible shell 10 in the region of the front wheel housing 11. The shell 10 encompasses a lateral longitudinal member 12 which extends between the front wheel housing 11 and a known type of rear wheel housing (not shown) in the longitudinal direction of the vehicle, and a front, inner longitudinal member 13, which also extends in the longitudinal direction of the vehicle within a front crumple zone designated generally by numeral 14 of the motor vehicle. The inner longitudinal member 13 in this arrangement borders an inner side 15 of the wheel housing 11.

The front wheel 17 with its associated wheel rim 18 is located within the front wheel housing 11 and is rotatable about an axle 16. Of the wheel guide members which guide and support the front wheel 17, only a long-and-short-arm suspension 19 is shown.

A tension strut 22 is arranged between a front end section 20 of the lateral longitudinal member 12, which borders a rear side 21 of the front wheel housing 11, and the inner longitudinal member 13, and is in this case secured by screw connections (not shown) to the longitudinal members 12, 13. The tension strut 22 is arranged at a minimum distance behind the tread circumference 23 of the front wheel 17 which ensures the free steering mobility of the front wheel 17. The end section 20 of the lateral longitudinal member 12 is configured as an impact absorber 24 which has particularly preferred energy absorption properties. More details of the arrangement of the tension strut 22 and its various embodiments are given below, in particular, with reference to the other drawing figures.

The rear side 21 of the front wheel housing 11 forms, in some regions, a front wall 25 arranged behind the tension strut 22 which divides the front-seat passengers' footwells from the wheel housing 11. The front wall 25 makes a transition, in a transitional region 26, into the vehicle floor 27 arranged behind it. The outer lateral limitation of the wheel housing 11 is formed by a wing 28, which is appropriately cut away in the region of the wheel housing 11. Not shown in this embodiment is an inner wheel housing lining which is arranged in the interior of the wheel housing 11, starting from a wheel housing groove 29 of the wing 28. The tension strut 22 is configured and arranged on the two longitudinal members 12, 13 so that it can be completely covered by the inner wheel housing lining (not shown).

Figure 2:
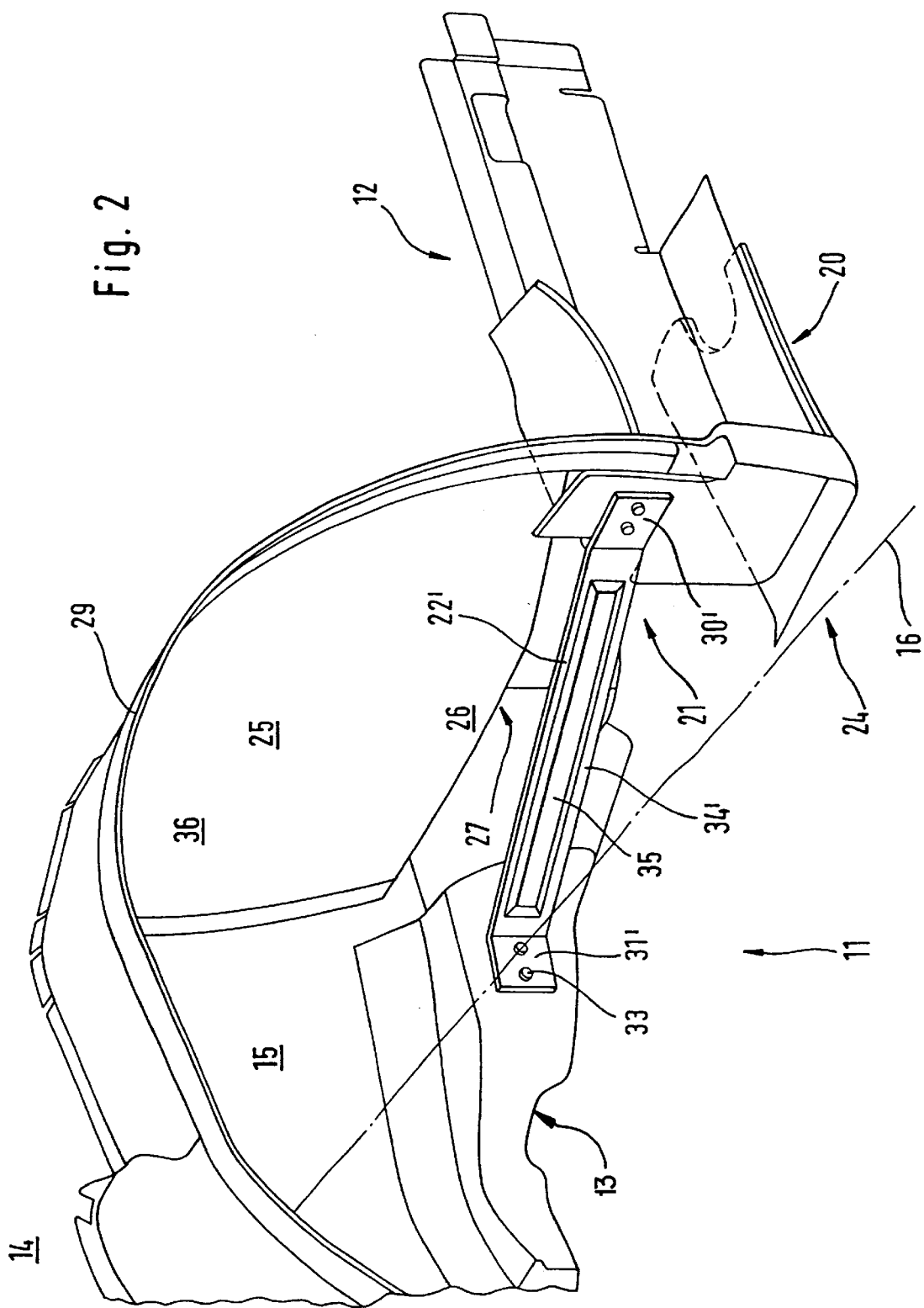
FIG. 2 is a perspective view of the protective arrangement according to the present invention arranged within a wheel housing and having a tension strut according to a first embodiment.

FIG. 2 shows a diagrammatic perspective view of the tension strut 22' arranged within the wheel housing 11 in accordance with a first embodiment. The tension strut 22' consists of a profiled tension band of sheet steel or a similar material. It is, of course, within the present invention also to use another material of a metallic or non-metallic type, for example a fiber composite.

The tension strut 22' is angled downwards at its two securing sections 30', 31' and secured by screws 33 or the like to the front end section 20 of the lateral longitudinal member 12 and to the inner longitudinal member 13. The tension strut 22 extends between the two longitudinal members 12, 13, preferably approximately horizontally and below or at the height of a horizontal plane which is defined by the axle 16 of the front wheel 17 (not shown). In its central intercepting section 34', the tension strut 22 has a bead 35 which increases the rigidity of the tension strut 22' against deformation and, in particular, its flexural rigidity.

The front wall 25 can be seen behind the tension strut 22' and makes a transition from an approximately vertically extending section 36 through the transitional region 26 into the floor (not shown here). The end section 20 of the lateral longitudinal member 12 is again configured as an impact absorber 24.

Figure 3:
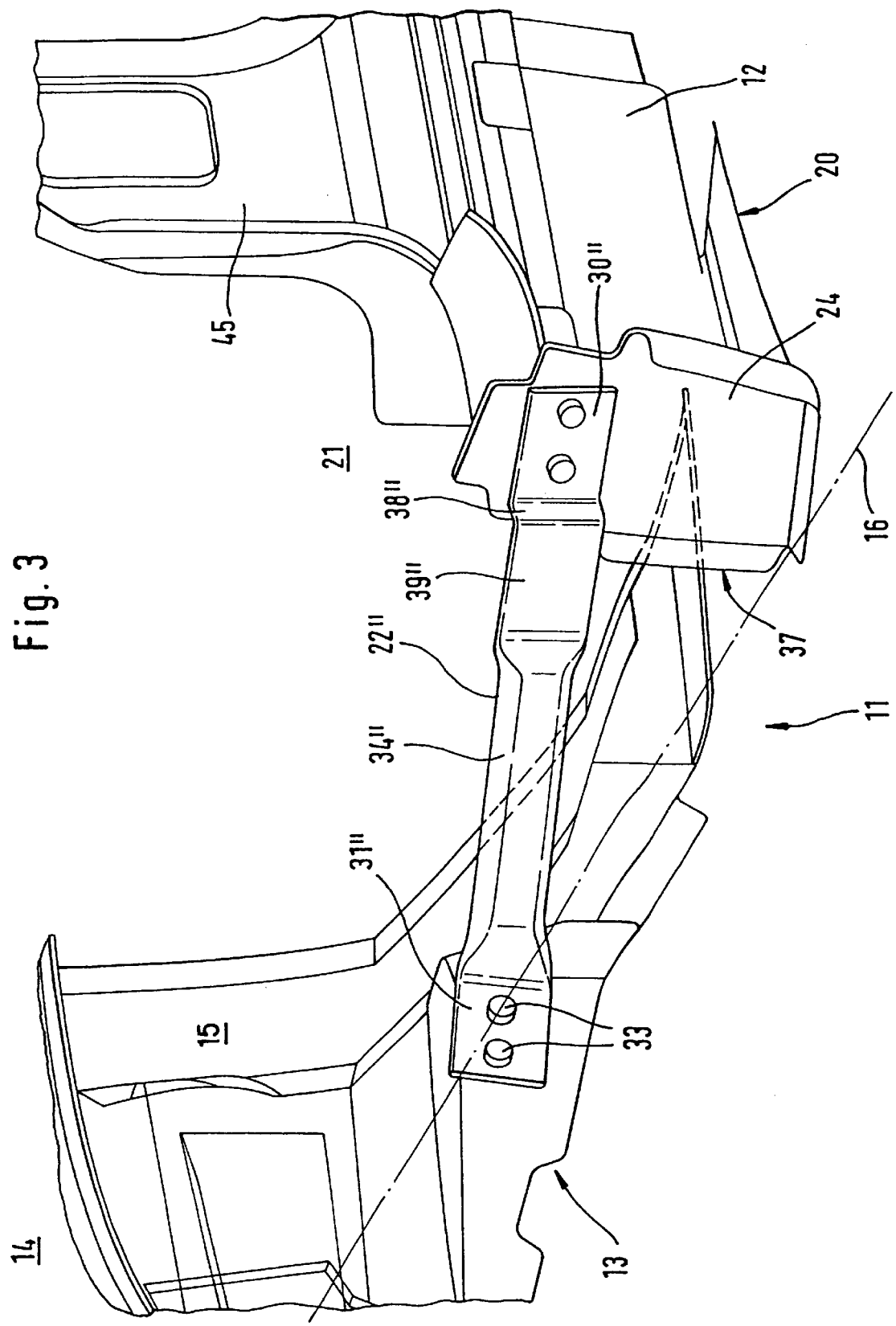
FIG. 3 is a further perspective view of the protective arrangement according to the present invention arranged within the wheel housing and having a tension strut according to a second embodiment.

FIG. 3 is a perspective view enlarged relative to FIG. 2, of the tension strut 22" arranged within a wheel housing 11 in accordance with a particularly preferred second embodiment. The tension strut 22" is formed from a tube of oval cross section which, at its ends in the region of the fixing sections 30", 31", is angled downwards towards the intercepting section 34" and pressed flat, and is fixed to the end section 20 of the lateral longitudinal member 12 and to the inner longitudinal member 13 by screws 33, rivets or the like. Instead of the releasable screw connection, the tension strut 22" can also be fixed to the shell 10 by a non-releasable connection, for example a welded connection.

In FIG. 3, only the front and lateral longitudinal members 12, 13 of the shell 10 can be seen. A lower part 45 of the A-column is apparent above the lateral longitudinal member 12. FIG. 4 shows a section of a view from below of the tension strut 22" of FIG. 3 arranged between the front and lateral longitudinal members 12, 13. The approximately vertical section 36 of the front wall 25 can be seen behind the tension strut 22", in the direction of travel, and is arranged at a minimum distance A behind the tension strut 22".

The intercepting section 34" of the tension strut 22", which extends approximately horizontally, includes an angle α of approximately 100–140° with the fixing section 31 facing the front longitudinal member 13 or with the longitudinal member 13. This angle α may, of course, be selected to be larger or smaller depending on the respective vehicle type and the shell. The angle α is also selected so that the force exerted by a front wheel 17 on the tension strut 22" in the event of a frontal impact is passed into the inner longitudinal member 13 with a maximum possible normal force vector, loading the latter preferably in its longitudinal direction. It further serves to deflect the front wheel 17, impacting on the tension strut 22", towards the end section 20 of the lateral longitudinal member 12.

Approximately in the extension of an inner longitudinal member flank 37 of the lateral longitudinal member 12, the tension strut 22" has a right-angled stop bend 38" which divides the tension strut 22", at its end facing the lateral longitudinal member 12, into the pressed-flat reinforcing section 30" and the stop section 39". The right-angled stop bend 38" is so configured that an inner or outer rim flare of the front wheel rim 18 can impact upon this bend in the event of a crash. The purpose is to prevent a front wheel 17 with outward lock at the front or front wheel 17 moving backwards from an oblique forward position being moved into the region of the front wall 25, but, if possible, to move it into the region of the end section 20 of the lateral longitudinal member 12 or of the impact absorber 24 integrated therein for the absorption of the accident energy.

FIG. 5 shows the tension strut 22" of FIG. 3, in which slots 41, 42 are provided in the two fixing sections 30", 31"

to compensate the horizontal and vertical tolerance of the tension strut 22". The pressed-flat fixing sections 30", 31" are, as a result of their flat, double-walled structure, particularly suited to the absorption of high tensile stresses, which, in the event of a crash, starting from the front wheel 17, initially detained in its movement by the tension strut 22", are passed via the screw connection 33 into the inner longitudinal member 13 and so into the front crumple zone of the vehicle.

The intercepting section 34" of the tension strut 22" makes a transition in two transitional sections 43", 44" into the region of the fixing sections 30", 31". The transitional sections 43", 44" are so shaped and manufactured that the strength of the tension strut 22" in this region is hardly reduced. The oval intercepting section 34" shown in FIG. 6 is configured to withstand, in particular, high bending and tensile forces. The cross section is inclined at an angle β of about 10° to the vertical in order to achieve very good blocking performance and a particularly good retention effect if impacted by a front wheel 17.

FIG. 7 is a side view through the tension strut 22" of FIG. 5 with the fixing section 31", which is fixed to the longitudinal member 13. The fixing section 31" is inclined upwards at an angle γ of approximately 10–15° to the horizontal and fixed to a seating (not shown) on the longitudinal member 13 in order to withstand, in particular, high tensile forces. The fixing section 30" at the opposite end is preferably fixed approximately horizontally to a seating on the end section 20 of the lateral longitudinal member 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A protective arrangement on a wheel housing of a motor vehicle shell, comprising a front crumple zone, a lateral longitudinal member and a front inner longitudinal member, the front inner longitudinal member extending in the front crumple zone in a motor vehicle longitudinal direction and along an inside portion of an associated wheel housing, a wheel held by wheel guide members within the associated wheel housing, a front wall, which limits the wheel housing on a side thereof remote from the front crumple zone, relative to a passenger compartment of the motor vehicle, and a protection apparatus against excessive penetration of the front wall by the wheel moving towards the front wall in the event of a crash, the protection apparatus being arranged between a tread circumference of the wheel and the front wall, wherein the protection apparatus comprises an oblong-shape tension strut, said tension strut having a length that is substantially greater than its width and having a first fixing section fixed to the front inner longitudinal member and wherein said tension strut projects outwards laterally and transversely to the front inner longitudinal member and further includes a lateral intercepting section.

2. The protective arrangement according to claim 1, wherein the tension strut is fixed by a second fixing section to an end section of the lateral longitudinal member which extends in the longitudinal direction of the motor vehicle and, with an end section thereof, borders the side of the wheel housing remote from the front crumple zone.

3. The protective arrangement according to claim 1, wherein the tension strut is fixed at or below the height of a horizontal plane through an axle of the front wheel.

4. The protective arrangement according to claim 1, wherein the included angle between the intercepting section of the tension strut and a lateral section of the inner longitudinal member or the first fixing section is approximately 100–140°.

5. The protective arrangement according to claim 2, wherein screw connections releasably fix the tension strut to the inner longitudinal member and to the end section of the lateral longitudinal member.

6. The protective arrangement according to claim 5, wherein the tension strut has slots for the screw connections to compensate horizontal and vertical tolerance of the tension strut.

7. The protective arrangement according to claim 2, wherein the tension strut is non-releasably connected to the end section of the lateral longitudinal member and the inner longitudinal member.

8. The protective arrangement according to claim 2, wherein the end section of the lateral longitudinal member is an impact absorber.

9. The protective arrangement according to claim 1, wherein the tension strut comprises one of a fiber composite or a high-strength metallic material, including a profiled tension band of sheet steel.

10. The protective arrangement according to claim 2, wherein the tension strut is a tube having ends pressed flat in a region of the fixing sections.

11. The protective arrangement according to claim 10, wherein the tube has an oval cross section between the flat fixing sections in the region of the intercepting section.

12. The protective arrangement according to claim 2, wherein the fixing sections are angled relative to the intercepting section.

13. The protective arrangement according to claim 2, wherein the tension strut has a right-angled stop bend, located approximately in extension of an inner longitudinal member flank of the lateral longitudinal member.

14. The protective arrangement according to claim 2, wherein the tension strut has a stop section extending approximately perpendicularly to the longitudinal direction of the motor vehicle and is arranged between the intercepting section and the second fixing section.

15. The protective arrangement according to claim 1, wherein the tension strut is arranged within the wheel housing to be covered by an inner wheel housing lining.

\* \* \* \* \*